United States Patent [19]
Cheatham et al.

[11] Patent Number: 5,638,927
[45] Date of Patent: Jun. 17, 1997

[54] SUSPENSION DAMPER

[75] Inventors: Claude H. Cheatham, West Carrollton; James Mitchell Pees, Centerville; Joel Ray Wells, Huber Heights, all of Ohio

[73] Assignee: General Motors Corporation, Detroit, Mich.

[21] Appl. No.: 529,773

[22] Filed: Sep. 18, 1995

[51] Int. Cl.$^6$ ............................................. F16F 9/34
[52] U.S. Cl. .................. 188/322.19; 188/322.14; 188/322.17; 188/315
[58] Field of Search ............... 188/322.14, 315, 188/322.19, 281, 283, 313, 311–316, 318, 269, 322.17

[56] References Cited

U.S. PATENT DOCUMENTS

| | | | |
|---|---|---|---|
| 3,706,362 | 12/1972 | Faure | 188/322.14 |
| 4,109,767 | 8/1978 | Nandyal et al. | 188/322.14 |
| 4,185,721 | 1/1980 | Karklins et al. | 188/315 |
| 4,401,196 | 8/1983 | Grundei | 188/322.14 |
| 4,508,201 | 4/1985 | Axthammer et al. | 188/322.19 |
| 4,633,983 | 1/1987 | Horvath et al. | 188/322.14 |
| 5,064,032 | 11/1991 | Ashiba | 188/322.14 |

FOREIGN PATENT DOCUMENTS

| | | | |
|---|---|---|---|
| 2309029 | 12/1990 | Japan | 188/322.14 |
| 5141468 | 6/1993 | Japan | 188/322.14 |
| 5196080 | 8/1993 | Japan | 188/322.14 |

*Primary Examiner*—Douglas C. Butler
*Attorney, Agent, or Firm*—Jeffrey A. Sedlar

[57] ABSTRACT

A suspension damper includes an integral one-piece reservoir tube arrangement which provides a self-centering feature for the internal components of the damper, supports the loading on those internal components for proper functioning of the twin-tube type damper and applies for a preload force through the internal components.

4 Claims, 2 Drawing Sheets

SUSPENSION DAMPER

BACKGROUND OF THE INVENTION

The present invention relates to suspension dampers for vehicular applications and more particularly, to twin-tube suspension dampers with a cylinder tube end assembly controlling fluid flow between the two tubes.

Conventional vehicle suspension dampers typically consist of direct double-acting telescopic hydraulic passive dampers. They are generally described as either shock absorbers or struts. A primary purpose of shock absorbers is to dampen oscillations of the vehicle's suspension springs. This is accomplished by converting kinetic energy in the form of motion between the sprung and unsprung masses of the vehicle into heat and then dissipating the heat. Struts also serve this capacity and in addition act as a structural member to support reaction and side load forces on the suspension system.

Typical dampers are hydraulic devices using oil as the medium for converting motion into heat. As the damper is cycled by the suspension system a piston is forced to move in extension and compression directions through oil contained within a cylinder tube. This creates pressure within the cylinder tube and a consequent pressure drop across the piston. During an extension stroke, high pressure is created in the extension chamber of the cylinder tube above the piston forcing oil to flow through valving in the piston.

During a compression stroke, high pressure is created in the compression chamber of the cylinder tube below the piston, forcing oil to flow back through the piston's valving. As the piston moves an amount of oil equal to the volume of the piston rod entering or exiting the cylinder tube is forced through the piston valving or through a compression valve assembly in the base of the cylinder tube in combination with the piston valving.

Twin-tube dampers provide a reservoir between the cylinder tube and a reservoir tube which often carries a pressurized gas charge and serves as a means of compensating for the cycling of the piston rod into and out of the cylinder tube. The pressurized gas charge may also assist in the flow of fluid from the reservoir into the cylinder tube.

In order to house the damper as thus far described, a tube having a completely closed bottom portion is generally provided. The top end of the tube generally includes an opening through which the piston rod extends and provides a means of sealing the area of the opening around the piston rod. Various techniques are presently used to close the ends of the tubular sections for suspension dampers.

One conventional method is to place a base cup in the bottom end of the tube and seal the base cup to the tube by means such as gas metal arc welding or resistance seam welding to complete the bottom closure. These welds are conventionally used because they produce a strong and leak-free joint. Other methods of closing the tube section include passing the tube through a series of extrusion processes with intermediate annealing operations to produce a tubular closed end from a solid steel blank. Additionally, hot-forming a tube by means of an external forming tool is known.

Twin-tube type dampers generally include a base cup that is used to locate various internal components such as the cylinder tube by engaging the cylinder tube end assembly and the rod guide. In addition, the base cup supports the internal loading on both components for the proper functioning of the twin-tube type damper assembly.

SUMMARY OF THE INVENTION

The conventional twin-tube damper has been found to generate noise created by relative movement between the base cup and the cylinder tube end assembly which is objectionable. This is because the two components engage one another but are not, fixed together. The forces on a damper during suspension operation, work to create the relative movement which results even though the damper's tube assembly is of a rigid nature.

It is the intention of the present invention to provide a suspension damper assembly which more securely locates the various individual components relative to one another. This is accomplished by eliminating the conventional base cup and providing an integral bottom closure for the reservoir tube. This preferably includes a self-centering feature for the various internal components such as the cylinder tube and rod guide assembly. In addition, a means of supporting the dynamic loading of the internal components provides for proper functioning of the twin-tube type damper while eliminating objectionable noise generation.

According to this aspect of the present invention a twin-tube suspension damper is provided which includes a secure leak-free bottom closure joint that is completely formed by the reservoir tube material itself. A self-centering feature is provided by the cylinder tube end assembly which includes a designed-in geometry compatible with the closed end of the reservoir tube. This permits the application of a preload force between the cylinder tube end and the reservoir tube's bottom closure that inhibits relative movement between the internal components. The resultant structure provides for ease of assembly and the elimination of a potential noise source.

DETAILED DESCRIPTION OF THE PRESENTLY PREFERRED EMBODIMENT

Figure 1:
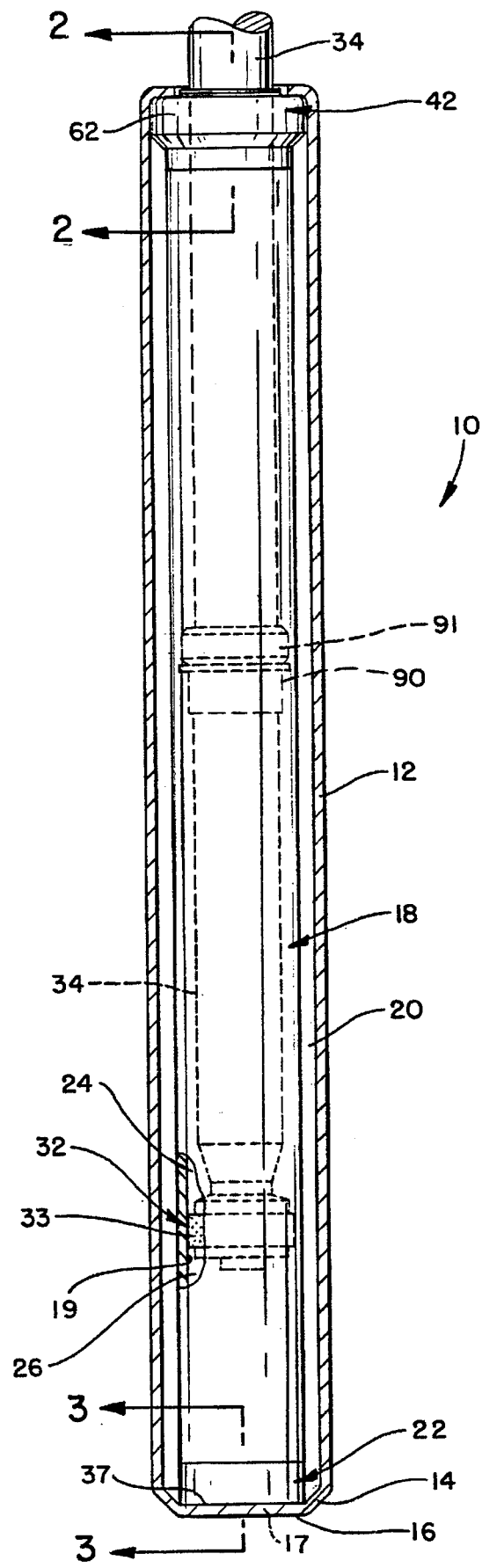
FIG. 1 is a fragmentary sectional view of a twin-tube suspension damper assembly.

Referring to the drawings, illustrated in FIG. 1 is a suspension damper 10. Damper 10 includes a generally steel cylindrical reservoir tube 12 which is closed at its lower end 16. Lower end 16 includes conventional means (not illustrated), for connection to the vehicle's wheel assembly (not illustrated). The reservoir tube 12 is embodied as a metal structure with a homogeneous composition throughout its length including the closed lower end 16 and partly closed top at annular leg 70.

Axially disposed within the reservoir tube 12 is a cylinder tube 18. The cylinder tube 18 has a smaller diameter than the reservoir tube 12 and cooperates therewith to provide a reservoir 20 within damper 10. The reservoir 20 contains a quantity of oil that is used as a damping medium in the damper 10. The reservoir tube 12 optionally carries a gas charge as is conventionally known in the art. The cylinder tube 18 is carried in the damper 10 between a cylinder tube end assembly 22 and a rod guide assembly 42.

A piston assembly 32 is slidably and sealingly carried within cylinder tube 18. The piston assembly includes a band of low friction material 33 which engages the interior wall 19 of cylinder tube 18. The piston assembly 32 separates the cylinder tube 18 into extension chamber 24 and compression chamber 26.

The extension chamber 24 is defined radially between the piston rod 34 and the interior wall 19 of cylinder tube 18. The extension chamber 24 is defined longitudinally between the piston assembly 32 and the rod guide assembly 42. The extension chamber 24 is embodied in a cylindrical configuration inside the cylinder tube 18 between the piston assembly 32 and the rod guide 42. The compression chamber 26 is defined radially inside the interior wall 19 of cylinder tube 18. Longitudinally, the compression chamber is defined between piston assembly 32 and cylinder tube end assembly 22.

The piston rod 34 extends through the extension chamber 24 and through the rod guide assembly 42 out of the cylinder tube 18. The upper end of the piston rod 34 (not illustrated) provides a means of attachment to the structure of a vehicle body. Therefore, relative movement between the vehicle body and its wheel assembly (not illustrated), results in relative sliding motion of the piston assembly 32 within the cylinder tube 18 during compression and extension of the damper 10.

This relative movement results in longitudinal forces being transferred via friction between the piston assembly 32 and the cylinder tube 18 and between the rod guide 42 and the piston rod 34. In addition, lateral forces in the suspension system are transferred between the piston rod 34 and the rod guide assembly 42 and between the piston assembly 32 and the cylinder tube 18. Therefore, the cylinder tube 18 is securely fixed in location between the rod guide assembly 42 and the cylinder tube end assembly 22.

Figure 3:
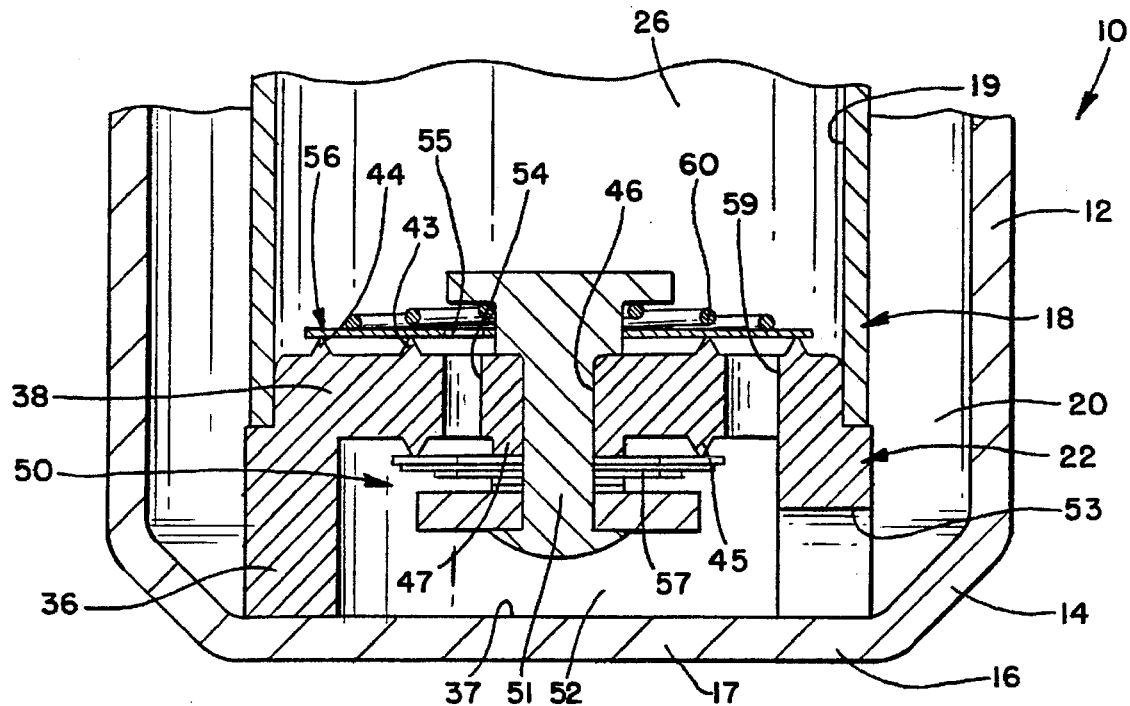
FIG. 3 is a detailed cross-sectional view of the bottom closed end of the suspension damper assembly taken generally through the plane indicated by the line 3—3 in FIG. 1.

Referring to FIG. 3, an enlarged view of the lower end 16 area of the damper 10 is shown. The reservoir tube 12 is formed so as to integrally define a bottom closure at the lower end 16 by means of integral angled annular wall 14 and integral circular wall 17 which is disposed normal to the vertical wall 21 of the cylinder tube 18.

The cylinder tube end assembly 22 includes an annular leg 36 which is matingly seated on the flat inner surface 37 of circular wall 17. The cylinder tube end assembly 22 is self-centered in the reservoir tube 12 by means of the annular angled wall 14 which directs the annular leg 36 onto flat inner surface 37 when the cylinder tube 18 and cylinder tube end assembly 22 are inserted into the reservoir tube 12 during assembly.

The cylinder tube end assembly 22 also includes a base wall 38 which includes a pair of upper annular ribs 43 and 44 and a lower annular rib 45. A central opening 46 extends through the base wall 38 which integrally forms an annular boss 47 about the central opening 46. The cylinder tube end assembly 22 forms a compensation chamber 52 inside the annular leg 36 and below the base wall 38.

A valve assembly 50 is carried by the cylinder tube end assembly 22 by a pin 51 which extends through central opening 46 and is fixed therein. A series of openings are radially disposed through the annular leg 36 such that it generally resembles a plurality of feet. The series of openings are represented by the opening 53. The opening 53 provides a means of fluid communication between the reservoir 20 and the compensation chamber 52.

Fluid flowing from the compression chamber 26 to the compensation chamber 52 during a compression stroke of the damper 10 flows through a series of longitudinal openings through the base wall 38 representative of which is longitudinal opening 54. A series of openings, represented by opening 55, permit fluid flow through the disc 56 to the longitudinal opening 54. A deflectable disc stack 57 is carried by the pin 51 against lower annular rib 45. The disk stack 57 is deflected by the fluid flowing through the longitudinal opening 54.

During an extension stroke of the damper 10, fluid flowing from the compensation chamber 52 to the compression chamber 26 passes through a series of longitudinal openings in the base wall 38, representative of which is longitudinal opening 59. The fluid flowing through longitudinal opening 59 moves disc 56 off from its seat on upper annular ribs 43 and 44 towards which it is biased by a spring 60.

The reciprocal action of the damper 10 during extension and compression strokes tends to result in high fluid forces on the cylinder tube end assembly 22 along with forces that are transmitted to the cylinder tube 18 by the piston assembly 32. Therefore, the cylinder tube end assembly 22 is biased against the circular wall 17 by a preload which is imparted to the cylinder tube 18 by the rod guide assembly 42.

Figure 2:
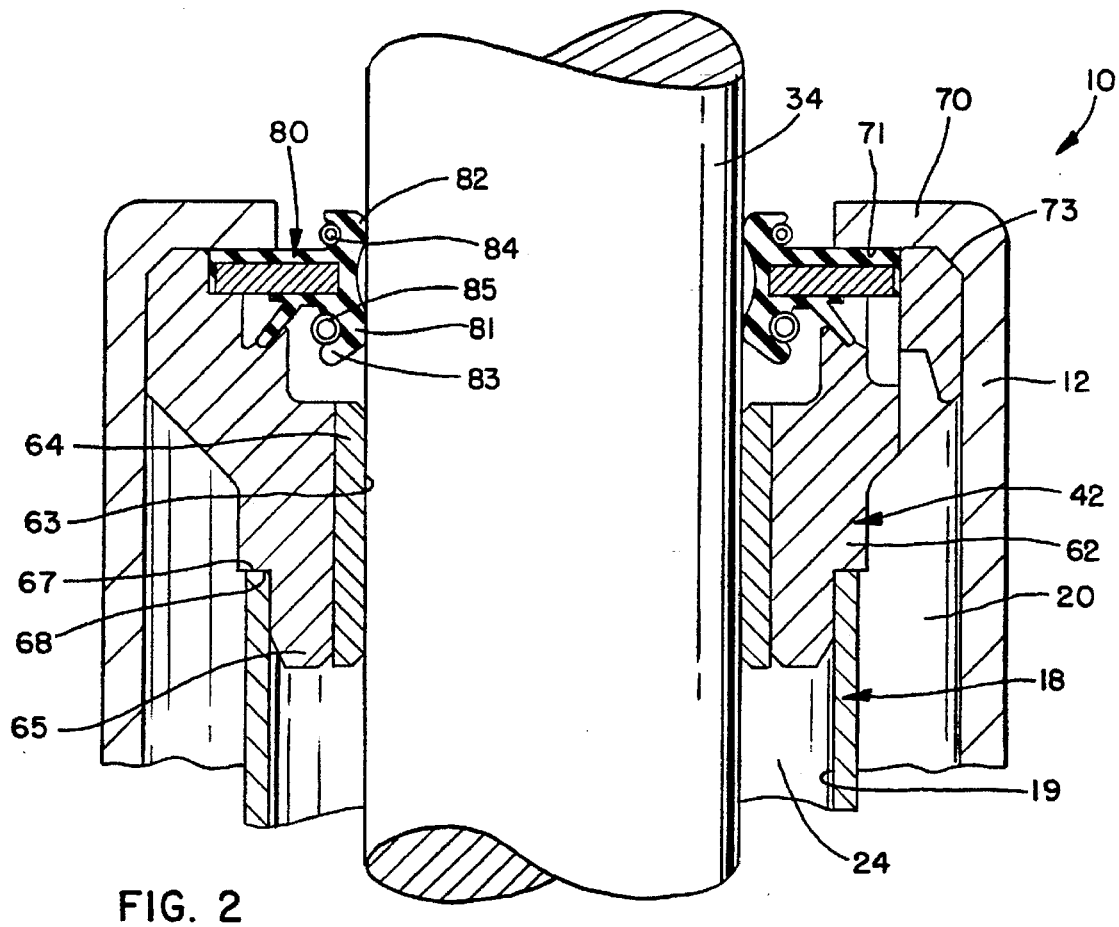
FIG. 2 is a detailed cross-sectional view of the top sealed end of the suspension damper assembly taken generally through the plane indicated by the line 2—2 in FIG. 1.

More specifically, referring to FIG. 2, the rod guide assembly 42 includes a generally annular body 62 with an opening 63 that carries a cylindrical bearing 64. The bearing 64 engages the piston rod 34 and provides support therefor. The rod guide assembly 42 includes an annular leg 65 which is received within the cylinder tube 18 such that the end 67 of the cylinder tube 18 is securely received in an annular seat 68. A preload force is applied to the body 62 by the integral inwardly directed annular leg 70 of the reservoir tube 12. Formation of the annular leg 70 about the body 62 results in the preload force being applied to the internal components including the rod guide 42, cylinder tube 18 and cylinder tube end assembly 22. The preload force is opposed and carried by the integral one-piece arrangement of the reservoir tube 12.

The area 71 of annular leg 70 compresses the seal 80 providing a static seal means of engagement. The preload force is concentrated at the annular shoulder 73 so that it is directed to the body 62. This ensures that excessive force is not transmitted to a seal assembly 80 that is carried by the body 62.

The seal assembly 80 includes a generally annular resilient element 81 with two legs 82 and 83 which sealingly engage the piston rod 34. A pair of garter springs 84 and 85 bias the legs 82 and 83 against the piston rod 34.

Referring again to FIG. 1, the piston rod 34 fixedly carries an annular ring 90 which supports a resilient annular bumper 91. The ring 90 and bumper 91 arrangement serves as a rebound stop by engaging rod guide assembly 42 to limit extension of the damper 10. This results in the application of forces to the rod guide assembly 42 which tends to jar the internal components of the damper 10. The preload, applied to the internal components including the rod guide assembly 42, the cylinder tube 18 and the cylinder tube end assembly 22 by the integral reservoir tube arrangement 12 provides a secure structural arrangement for sustaining these applied forces.

What is claimed is:

1. A suspension damper comprising:
   a rod guide assembly having a bore with a counterbore;
   a rod extending through the bore;
   a rebound stop positioned on the rod and engageable with the rod guide to limit extension of the damper;
   a seal having a resilient element, the seal disposed in the counterbore and engaging the rod;

a cylinder tube having a first end engaging the rod guide assembly and having a second end;

a cylinder tube end assembly having a base wall received within the second end of the cylinder tube and having an annular leg extending from the base wall, the annular leg having an outer perimeter completely disposed normal to the base wall; and a one-piece reservoir tube having a tubular body with a closed bottom engaging the cylinder tube end assembly and the one-piece reservoir tube having an upper annular leg engaging the rod guide assembly such that the one-piece reservoir tube imparts a preload bias that seats the cylinder tube end assembly against the closed bottom of the reservoir tube preventing relative movement between the cylinder tube end assembly and the close bottom, wherein the closed bottom of the reservoir tube includes an integral annular angled wall and a flat circular wall disposed normal to the tubular body wherein the annular leg of the cylinder tube end assembly engages the flat circular wall and wherein the cylinder tube end assembly is self-centered in the reservoir tube through interaction of the inner leg with the annular angled wall and the flat circular wall during assembly.

2. A suspension damper comprising:

a rod guide assembly having a bore with a stepped counterbore forming a seal seat with a radially innermost inside edge, the rod guide having an outer perimeter with an annular shoulder disposed coaxially around the counterbore;

a rod extending through the bore;

a seal having a resilient element, the seal disposed in the counterbore on the seal seat and engaging the rod;

a cylinder tube defining a working chamber and having a first end engaging the rod guide assembly and having a second end;

a cylinder tube end assembly having a base wall received within the second end of the cylinder tube and having an annular leg extending from the base wall, the annular leg having an outer perimeter, the entirety of the outer perimeter being disposed normal to the base wall; and a one-piece reservoir tube defining a reservoir chamber about the working chamber and having a tubular body with a closed bottom, the closed bottom engaging the cylinder tube end assembly and the one-piece reservoir tube having an upper annular leg engaging the rod guide assembly, the upper annular leg being normal to the tubular body and the upper annular leg having a terminal end and an adjacent area that directly engages and compresses the seal such that the one-piece reservoir tube imparts a preload bias that seats the cylinder tube end assembly against the closed bottom of the reservoir tube, wherein the preload bias is concentrated at the annular shoulder of the rod guide assembly so that the seal is not excessively compressed, wherein the closed bottom of the reservoir tube includes an integral annular angled wall and a flat circular wall disposed normal to the tubular body wherein the annular leg of the cylinder tube end assembly engages the flat circular wall and wherein the cylinder tube end assembly is self-centered in the reservoir tube through interaction of the annular leg with the annular angled wall and the flat circular wall during assembly.

3. A suspension damper according to claim 2 wherein the rod guide includes an opening extending between the counterbore and the outer perimeter of the rod guide and wherein the seal includes a check leg that engages the rod guide in the counterbore normally closing the opening.

4. A suspension damper according to claim 2 wherein the terminal end of the upper annular leg is disposed radially inside the inside edge of the seal seat.

* * * * *